US 9,883,386 B2

(12) United States Patent
Danree et al.

(10) Patent No.: US 9,883,386 B2
(45) Date of Patent: Jan. 30, 2018

(54) METHOD AND A SERVER FOR MANAGING PROFILES

(71) Applicant: OBERTHUR TECHNOLOGIES, Colombes (FR)

(72) Inventors: Arnaud Danree, Colombes (FR); Guillaume Larignon, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 15/314,004

(22) PCT Filed: May 26, 2015

(86) PCT No.: PCT/FR2015/051379
§ 371 (c)(1),
(2) Date: Nov. 25, 2016

(87) PCT Pub. No.: WO2015/181485
PCT Pub. Date: Dec. 3, 2015

(65) Prior Publication Data
US 2017/0188230 A1 Jun. 29, 2017

(30) Foreign Application Priority Data

May 27, 2014 (FR) .................................... 14 54765

(51) Int. Cl.
*H04W 12/04* (2009.01)
*H04L 29/08* (2006.01)
(Continued)

(52) U.S. Cl.
CPC ........... *H04W 12/04* (2013.01); *H04L 67/306* (2013.01); *H04W 8/18* (2013.01); *H04W 12/08* (2013.01)

(58) Field of Classification Search
CPC ....... H04W 12/04; H04W 12/08; H04W 8/18; H04L 67/306
See application file for complete search history.

(56) References Cited

U.S. PATENT DOCUMENTS 8,571,585 B2 * 10/2013 Weigele ............ H04M 1/72525
455/411
8,948,729 B2 * 2/2015 Adler .................. H04L 63/0272
455/411
(Continued)

FOREIGN PATENT DOCUMENTS

EP    2600587 A1    6/2013
EP    2680627 A1    1/2014
(Continued)

OTHER PUBLICATIONS

PCT International Search Report dated Sep. 22, 2015, International Application No. PCT/FR2015/051379, pp. 1-7 (Includes English Translation).

*Primary Examiner* — Nathan Mitchell
(74) *Attorney, Agent, or Firm* — MH2 Technology Law Group, LLP

(57) ABSTRACT

A method that may be performed by a profile management server for managing the profiles of a secure entity, such as an embedded universal integrated circuit card. The method may include sending a message to the secure entity in order to modify the active profile of the entity; initializing and starting a timer; and in the event that the server does not receive a message indicating which profile is active in the secure entity before the expiry of a predetermined duration after the starting of the timer, then starting an audit procedure for determining which profile is actually active in the secure entity.

10 Claims, 2 Drawing Sheets

(51) Int. Cl.
  *H04W 8/18*    (2009.01)
  *H04W 12/08*   (2009.01)

(56) References Cited

U.S. PATENT DOCUMENTS

| | | | | |
|---|---|---|---|---|
| 9,559,907 B2* | 1/2017 | Burks | .................. | G06F 9/44505 |
| 2005/0227677 A1* | 10/2005 | Kallio | .................... | H04L 29/06 |
| | | | | 455/414.3 |
| 2007/0208937 A1* | 9/2007 | Cam-Winget | ........ | H04L 9/0844 |
| | | | | 713/168 |
| 2010/0167696 A1* | 7/2010 | Smith | .................. | H04W 8/183 |
| | | | | 455/411 |
| 2010/0325313 A1* | 12/2010 | Esteve Asensio | .... | G06F 9/4451 |
| | | | | 709/246 |
| 2011/0306318 A1* | 12/2011 | Rodgers | ................ | H04W 8/183 |
| | | | | 455/410 |
| 2013/0159476 A1* | 6/2013 | Hilburn | ................. | H04L 67/303 |
| | | | | 709/220 |
| 2013/0196655 A1* | 8/2013 | Zabawskyj | ............. | H04L 12/14 |
| | | | | 455/432.3 |
| 2013/0344864 A1* | 12/2013 | Park | ........................ | H04W 8/18 |
| | | | | 455/432.3 |
| 2014/0004827 A1* | 1/2014 | O'Leary | ................. | H04W 8/22 |
| | | | | 455/411 |
| 2014/0357229 A1* | 12/2014 | Lee | ....................... | H04W 12/04 |
| | | | | 455/411 |
| 2015/0271662 A1* | 9/2015 | Lhamon | ................ | H04W 8/183 |
| | | | | 370/329 |
| 2015/0350881 A1* | 12/2015 | Weiss | .................... | H04W 4/001 |
| | | | | 455/558 |

FOREIGN PATENT DOCUMENTS

| | | |
|---|---|---|
| KR | 20130049730 A | 5/2013 |
| KR | 20140024796 A | 3/2014 |

* cited by examiner

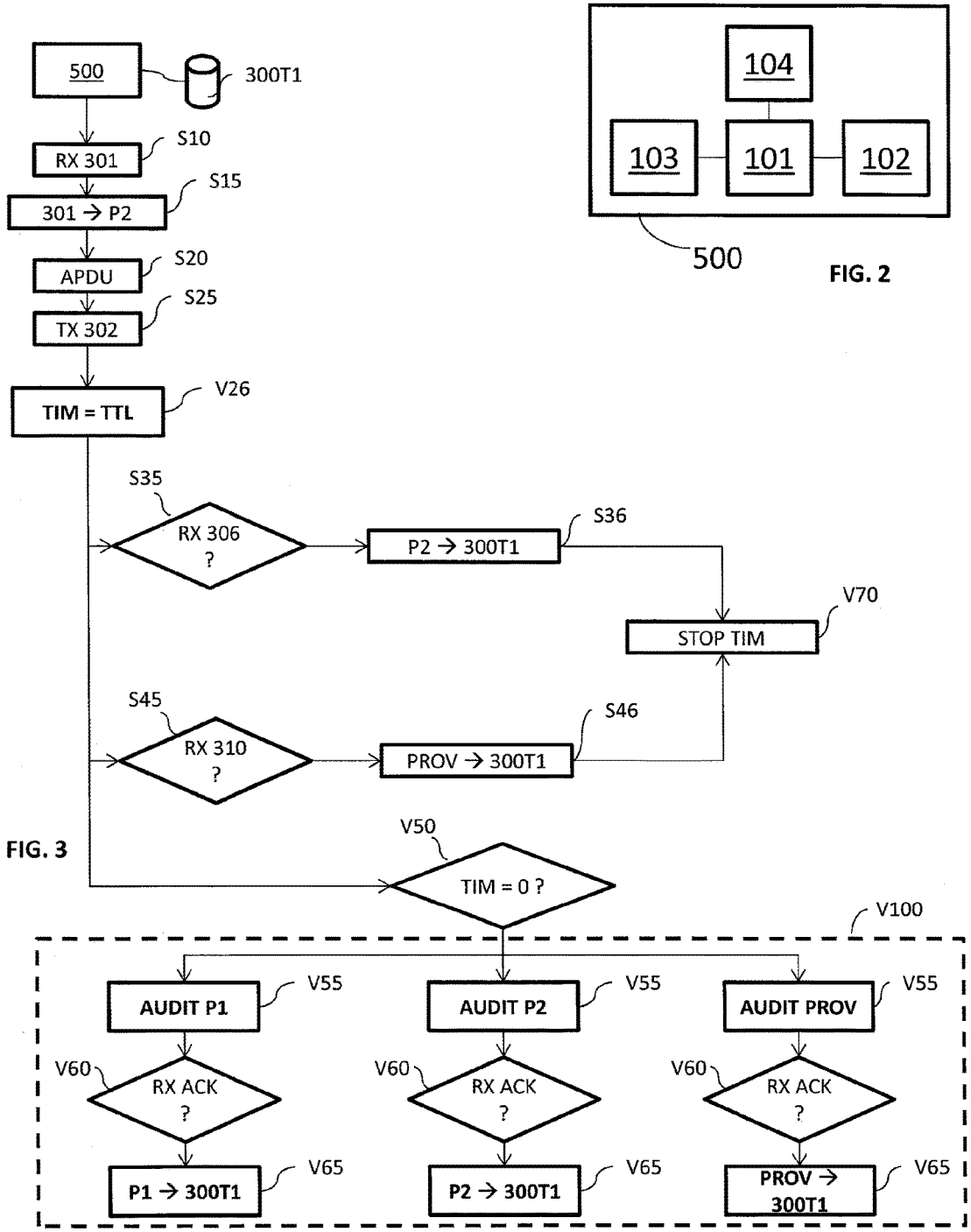

METHOD AND A SERVER FOR MANAGING PROFILES

CROSS-REFERENCE TO RELATED APPLICATIONS

This application is a U.S. National Stage application of International Application No. PCT/FR2015/051379 filed 26 May 2015, which claims priority to French Application No. 1454765 filed 27 May 2014, the entire disclosures of which are hereby incorporated by reference in their entireties.

BACKGROUND OF THE INVENTION

The invention relates to the field of supplying a profile to a secure entity incorporated in a mobile telecommunications terminal.

As a preliminary point, it should be recalled that a "profile" in the context of the invention is a set of files, data, and applications installed on a secure entity or for installation thereon, and enabling the terminal that incorporates the secure entity to access the services of a mobile telecommunications network as defined by the profile, once the profile has been activated.

FIG. 1 shows a method of managing profiles in compliance with the present state of the art. FIG. 1 shows a profile management server 300, a network router 200, and a secure entity 100 incorporated in a mobile terminal 80. The secure entity 100 is an entity of the embedded universal integrated circuit card (eUICC) type as defined by the GSM Association (GSMA). It should be recalled that unlike removable subscriber identity module (SIM) cards, an eUICC entity is an entity that is generally soldered in (and in any event that is not designed to be removed or replaced), and that enables profiles to be changed in secure manner.

It is assumed that the profile management server 300 receives a request 301 during a step S10 to activate a profile on a secure entity. This request may be of the following type:

request (enable-profile (EID, ICCID))

in which:
  EID is the unique identifier of the eUICC secure element; and
  ICCID is a unique identifier for identifying a profile in a secure entity.

It should be recalled that activating a profile in a secure element consists in deactivating the current active profile and in activating the new profile specified in the request.

Returning to FIG. 1, the profile management server 300 maintains a profile management table 300T1 for each secure element EID, as shown in Appendix A.

This table comprises for each profile:
  the identifier ICCID of the profile in the secure entity EID;
  the type of the profile. In the example of Appendix A, the table has one provisioning profile and two operational profiles P1 and P2;
  the state of the profile: deactivated or active; and
  the MSISDN telephone number associated with the profile.

In this example, it should be observed that the profile management server 300 knows that the current active profile of the secure element 100 is the operational profile P1.

On receiving the request 301, the profile management server 300 acts during a step S15 to identify the profile P2 in the table 300T1 from the identifier ICCID contained in the request, and it then generates an application protocol data unit (APDU) request in compliance with the standard ISO7816:

ENABLE_PROFILE(P2)

During a step S20, the profile management server 300 encrypts the APDU command and attaches a security header thereto, e.g. an SCP80 security header in compliance with the Global Platform standard:

Scp80-header // ENABLE_PROFILE(P2)

During a step S25, the profile management server 300 uses a transport service to send the frame constructed in step S20 to the MSISDN telephone number associated with the active profile P1 in the table 300T1. The profile management server defines a time-to-live for this message, e.g. equal to 24 hours.

By way of example, the transport service used for conveying this message and for managing the above-mentioned time-to-live may be the short message service (SMS), the GGSN service, or the Internet. It is assumed below that the SMS service is used.

SMS(Scp80-header // ENABLE_PROFILE(P2), MSISDN(P1), time-to-live)

This SMS message given reference 302 in FIG. 1 is conveyed to a profile status manager 120 of the secure entity 100 via the transport network, and in particular via the router 200. The profile status manager 120 receives the SMS message 302 during a step G10.

The profile status manager 120 of the secure entity 100 maintains a profile management table 100T1, as shown in Appendix B. This table is similar to the table 300T1 maintained by the profile management server 300 for this secure entity, except that it does not have the fourth column: MSISDN.

In this entity, it should be observed that the active profile of the secure example EID is the profile P1 and that the knowledge of the profile management server 300 is thus correct.

During a step G15, the profile status manager 120 removes the SCP80 security header and decrypts the content of the SMS message 302:

decrypt-scp80(302)

During a step G20, the profile status manager 120 executes the command for activating the profile P2, which amounts to deactivating the current active profile P1 and activating the new profile P2.

During a step G30, the profile status manager 120 places a REFRESH SIM Toolkit command in the buffer for the mobile terminal 80. The effect of processing this REFRESH command is to reinitialize the secure entity 100 and to execute a procedure for restarting the mobile terminal 80. During this restart procedure, the mobile terminal reads the table 100T1 and starts the authentication procedure associated with the new profile P2.

This authentication procedure is defined by the ETSI standard TS 131 102 V11.6.0 (2013-10).

During a test G35, the profile status manager 120 verifies whether the authentication procedure has taken place successfully.

If so, the profile status manager 120 updates its table 100T1 during a step G36 and acts during a step G40 to send an MSM message 306 to the profile management server 300 to inform it that the profile P2 is indeed active:

send-SMS (P2-enabled-OK, MSISDN(300))

By way of example, the profile status manager 120 may find the MSISDN number of the server 300 from the message 302 or it may obtain this number from a memory of the secure entity. The message 304 is normally received by the profile management server 300 during a step S30.

This message 306 is normally received by the profile management server 300 during a step S35. Under such circumstances, the profile management server 300 stores in its table 300T1 that the profile P2 is active, such that the tables 300T1 and 100T1 are synchronized (step S36).

In the event of the authentication procedure failing, the profile status manager 120 starts an emergency or "fallback" procedure consisting in activating the provisioning profile (step G50), in updating the table 100T1 (step G51), and in sending (step G55) an SMS message 310 to the profile management server 300 to inform it that the provisioning profile has been activated:

send-SMS (provisioning-enabled-OK, MSISDN(300))

This message 310 is normally received by the profile management server 300 during a step S45. Under such circumstances, the profile management server 300 stores in its table 300T1 that the profile P2 is active such that the tables 300T1 and 100T1 are synchronized (step S46).

Consequently, and in summary, there are four messages that might be sent by the profile status manager 120 of the secure entity 100 to the profile management server 300:

the message 304 acknowledging reception of the message 302 for activating the profile P2;
the message 306 indicating that the profile P2 has been successfully activated;
the message 308 indicating that activation of the profile P2 has failed; and
the message 310 indicating that the provisioning profile has been activated successfully.

Failure of the profile management server 300 to receive the messages 306 or 310 indicating successful activation of the profile P2 or of the provisioning profile leads to the profile management tables 300T1 and 100T1 becoming desynchronized, since in either of these situations the profile management server considers that the profile P1 is still the current active profile. This situation is harmful, since if the server 300 seeks subsequently to contact the secure entity 100, e.g. in order to send it an updating script, it will consult the table 300T1 and thus make use of the MSISDN telephone number of the profile P1 instead of the number of the profile that is indeed active.

The present invention proposes a profile management method that does not present the above-specified drawbacks.

OBJECT AND SUMMARY OF THE INVENTION

More precisely, and in a first aspect, the invention provides a method performed by a profile management server for managing the profiles of a secure entity. The method comprises:
a step of sending a message to said secure entity in order to modify the active profile of said entity;
a step of initializing and starting a timer; and
in the event of said server not receiving a message indicating which profile is active in said secure entity before the expiry of a predetermined duration after said starting of a timer:
a step of starting an audit procedure for determining which profile is actually active in said secure entity.

Correspondingly, the invention also provides a profile management server for managing the profiles of a secure entity. The server comprises:
means for sending a message to said secure entity in order to modify the active profile of said entity;
means for initializing and starting a timer; and
in the event of said server not receiving a message indicating which profile is active in said secure entity before the expiry of a predetermined duration after said starting of a timer:
means for starting an audit procedure for determining which profile is actually active in said secure entity.

Thus, and in general manner, the invention proposes installing an audit procedure to enable the profile management server to determine the profile that is actually active in a secure entity in the event of the server not receiving this information explicitly after sending a message seeking to change the active profile.

The invention thus makes it possible to synchronize the profile management tables managed by the server and by the entity itself.

The invention serves above all to enable the profile management server to retain accurate information about the current active profile in the secure element. By way of example, it can thus address this profile successfully in order to send an updating script thereto.

The message sent by the server to modify the active profile of the entity may be:
a message for installing and activating a new profile;
a message for deactivating or deleting the active profile in favor of a new operational profile or of a provisioning profile; and/or
any message suitable for modifying the active profile or for switching over to the provisioning profile in the event of modification failing.

In a particular implementation, the timer is initialized on a duration corresponding to the time-to-live of the message sent by the server in order to modify the active profile of the secure entity.

This characteristic makes it possible to delay triggering the audit procedure for as long as possible.

In a particular implementation, the audit procedure consists in sending at least one script to the secure entity in order to obtain at least the status:
of the profile of the secure entity that server considers was active before the modification;
of the profile of the secure entity that server considers to be active after the modification; and
of the provisioning profile of the secure entity.

In a variant, the audit procedure consists in sending at least one script to the secure entity in order to obtain the status of all of the profiles of the entity that are known to the profile management server.

In a particular implementation, the script(s) include an APDU GET STATUS command. Advantageously, this command enables a status to be obtained without modifying it. In a variant, it is possible to use a GET DATA command, a SELECT command, or any other command or set of commands enabling the status to be read from one or more files of the secure entity without modifying it.

The above-mentioned scripts may be sent one after another without waiting for the time-to-live of the message conveying the script. In a variant, before sending a script, the method waits for the time-to-live of the message sending the preceding script, if no response is received to sending that message.

In a particular implementation, the various steps of the transmission regulation method are determined by computer program instructions.

Consequently, the invention also provides a computer program on a data medium, the program being suitable or being performed by a computer, the program including instructions adapted to performing steps of the above-mentioned transmission regulation method.

The program may use any programming language, and be in the form of source code, object code, or code intermediate between source code and object code, such as in a partially compiled form, or in any other desirable form.

The invention also provides a computer readable data medium including computer program instructions as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, said circuit being adapted to execute or to be used in the execution of the method in question.

BRIEF DESCRIPTION OF THE DRAWINGS

Other characteristics and advantages of the present invention appear from the following description made with reference to the drawings and the appendices, which show an implementation having no limiting character. In the figures:

FIG. 2 shows a profile status manager in accordance with the invention; and

FIG. 3 shows a profile management method in accordance with a particular implementation of the invention.

DETAILED DESCRIPTION OF AN IMPLEMENTATION

Figure 1:
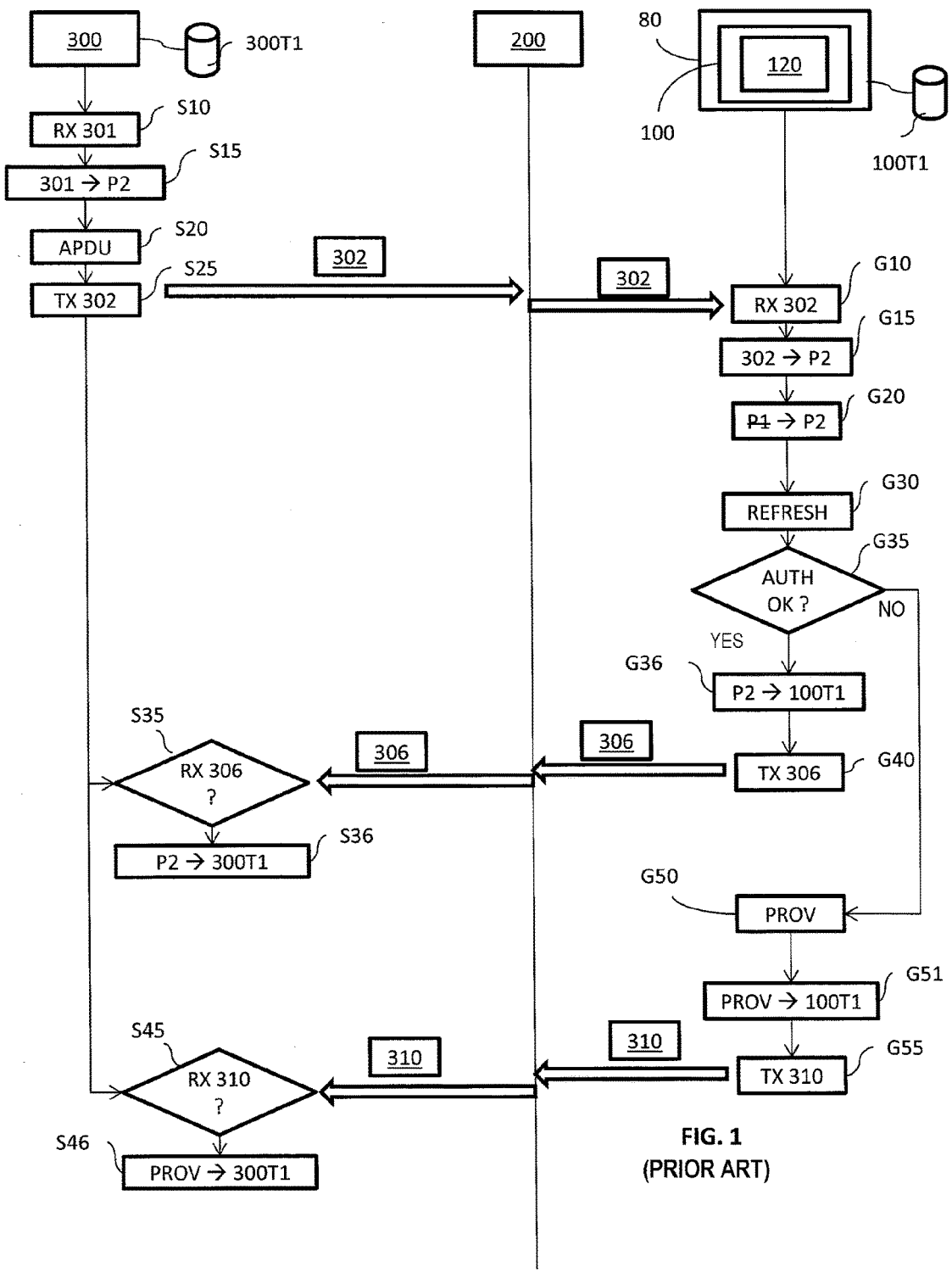
FIG. 1, described above, shows a prior art profile management method.

FIG. 2 shows a profile management server 500 in accordance with the invention. The profile management server 500 comprises a processor 101, a random access memory (RAM) 102, a ROM 103, and a network access module 104. These various elements are connected to one another by a bus system, not referenced.

The module 104 is suitable for sending and receiving frames and messages of the same type as the messages 301, 302, 304, 306, and 308 described with reference to FIG. 1.

The profile management server 500 performs a profile management method in accordance with the invention having its main steps shown in the form of a flow chart in FIG. 3. This profile management method may be performed by executing a computer program stored in the ROM 103.

FIG. 3 is a flow chart showing the main steps of a profile management method in accordance with the invention. The steps Sxx of this method are identical to the steps Sxx of the prior art profile management method described above with reference to FIG. 1.

The profile management method in accordance with the invention is remarkable in that, after the step S25 of sending a message 302 for modifying the active profile of the secure entity 100, it includes a step V26 of initializing a timer, constituted in this example by a countdown TIM.

In a variant, the timer may be constituted by a clock or by any other means for measuring a duration.

In the presently-described implementation, the countdown TIM is initialized with a duration corresponding to the time-to-live of the message 302.

In accordance with the invention, if the countdown TIM expires before a message 306 or 310 has been received indicating that a new profile (profile P2 or provisioning profile PROV) has indeed been activated, the profile management server 500 triggers an audit procedure given reference V100 in FIG. 3.

For this purpose, the method of the invention includes a step V50 for verifying whether the countdown TIM has expired, and the audit procedure is triggered if the result of the test V50 is positive.

The audit procedure consists in sending a plurality of scripts to the secure entity 100 in order to obtain at least the status:

of the profile of the server 500 that is considered as being active at the current instant, namely P1 in the presently-described example;

of the profile for which the server 500 is requesting activation, namely P2 in the presently-described example; and of the provisioning profile PROV.

In a variant, the audit procedure consists in sending scripts to obtain the statuses of all of the profiles of the secure entity 100 known to the server 500, i.e. all of the profiles listed in the profile management table 300T1 for this entity.

In the presently-described implementation, the various status-request scripts are sent to each of the profiles in parallel (step V55), using the APDU GET STATUS command:

SMS(Scp80-header // GET STATUS, MSISDN(P1))
SMS(Scp80-header // GET STATUS, MSISDN(P2))
SMS(Scp80-header // GET STATUS, MSISDN(PROV))

The use of the GET STATUS command advantageously makes it possible to discover the status of the profile without modifying the status.

When the profile management server 500 receives an acknowledgment of receipt (step V60), it updates its profile management table 300T1 (step V65).

The profile management table 300T1 of the server 500 in accordance with the invention is thus synchronized with the table 100T1 of the secure entity, even in the event of a failure of the messages 306 and 310 to get through.

If the server 500 receives one of the messages 306 or 310 before the expiry of the countdown TIP, it stops the countdown during a step V70.

In the presently-described implementation, the profile status-request scripts are sent in parallel. In a variant, they could be sent in series.

APPENDIX A

Table 300T1

| | ICCID | Profile type | Status | MSISDN |
|---|---|---|---|---|
| | 89103900000115765 | Provisioning | Deactivated | +34717742007 |
| P1: | 91038900000167165 | Operational | Active | +34717742009 |
| P2: | 98139000001671605 | Operational | Deactivated | +34177420097 |

APPENDIX B

Table 100T1

| | ICCID | Type of profile | Status |
|---|---|---|---|
| | 89103900000115765 | Provisioning | Deactivated |
| P1: | 91038900000167165 | Operational | Active |
| P2: | 98139000001671605 | Operational | Deactivated |

The invention claimed is:

1. A method performed by a profile management server for managing profiles of a secure entity, the method comprising:
   sending a message to said secure entity in order to modify an active profile of said secure entity;
   initializing and starting a timer; and
   in the event of said profile management server not receiving a message indicating which profile is the active profile in said secure entity before the expiry of a predetermined duration after said starting of the timer:
      starting an audit procedure for determining which profile of the profiles is the active profile in said secure entity.

2. A method according to claim 1, wherein said message to modify the active profile of said secure entity is a message for activating a new profile or a message for deactivating a currently active profile.

3. A method according to claim 1, wherein said timer is initialized based on a duration corresponding to a time-to-live of the message sent by said profile management server in order to modify the active profile of said secure entity.

4. A method according to claim 1, wherein said audit procedure includes sending at least one script to said secure entity in order to obtain at least a status:
   of a profile of said secure entity that said profile management server considers was active before said sending of the message to modify the active profile;
   of a profile of said secure entity that said profile management server considers to be active after said sending of the message to modify the active profile; or
   of a provisions profile of said secure entity.

5. A method according to claim 1, wherein said audit procedure includes sending at least one script to said secure entity in order to obtain a status of all of the profiles of said secure entity that are known to said profile management server.

6. A method according to claim 4, wherein said at least one script includes an application protocol data unit (APDU) GET STATUS command.

7. A method according to claim 5, wherein said at least one script includes an application protocol data unit (APDU) GET STATUS command.

8. A profile management server for managing profiles of a secure entity, the profile management server comprising:
   a memory that contains instructions;
   a network access module; and
   a processor, operably connected to the memory and the network access module, that executes the instructions to perform operations comprising:
      sending a message from the network access module to said secure entity in order to modify an active profile of said secure entity;
      initializing and starting a timer; and
      in the event of said profile management server not receiving a message indicating which profile is the active profile in said secure entity before the expiry of a predetermined duration after said starting of the timer:
         starting an audit procedure for determining which profile of the profiles is the active profile in said secure entity.

9. A non-transitory computer readable data medium storing a computer program including instructions that, when executed by a processor of a profile management server, perform a profile management method, the profile management method comprising:
   sending a message to a secure entity in order to modify an active profile of said secure entity, wherein said secure entity includes a plurality of profiles;
   initializing and starting a timer; and
   in the event that the profile management server does not receive a message indicating which profile, among the plurality of profiles, is the active profile in said secure entity before expiry of a predetermined duration after the starting of the timer, then
      starting an audit procedure for determining which profile among the plurality of profiles is the active profile in said secure entity.

10. A method according to claim 4, wherein sending at least one script comprises:
   sending a plurality of scripts in parallel to said secure entity.

* * * * *